E. S. MOWRY & H. HANSON.
ANCHOR.
APPLICATION FILED OCT. 22, 1910.
1,033,033.
Patented July 16, 1912.
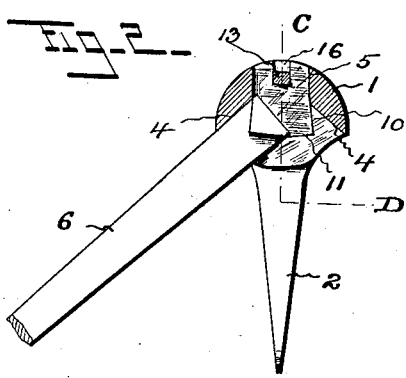
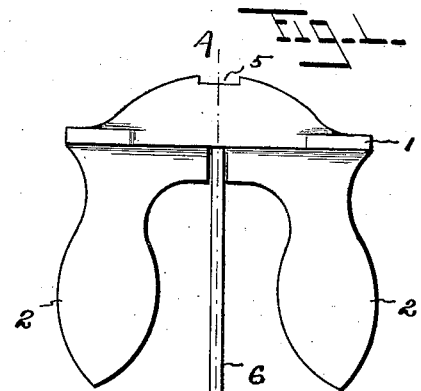
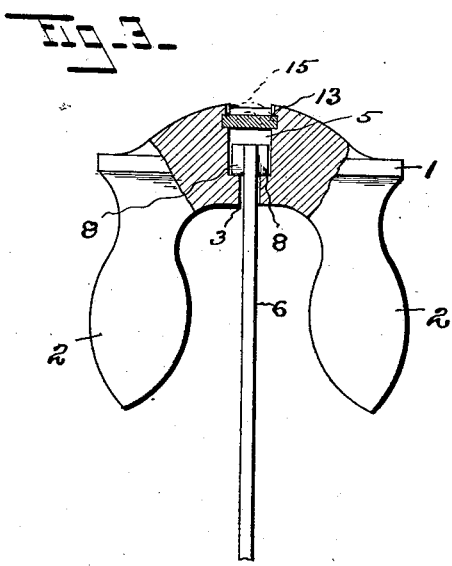
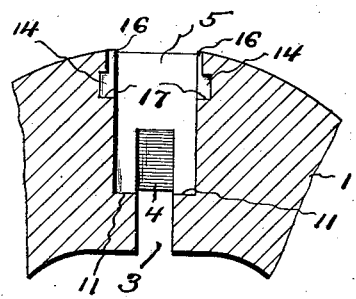
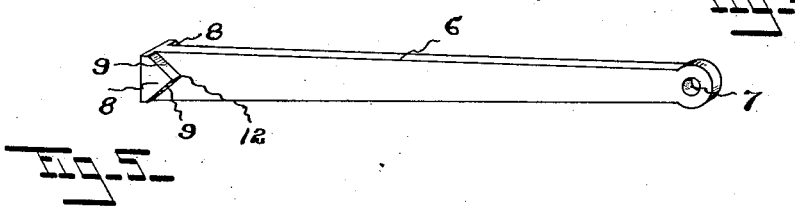
WITNESSES:
INVENTORS
Edward S. Mowry
and
Henry Hanson
BY
George E. Hall
ATTORNEY

UNITED STATES PATENT OFFICE.

EDWARD S. MOWRY AND HENRY HANSON, OF MIDDLETOWN, CONNECTICUT.

ANCHOR.

1,033,033.  Specification of Letters Patent.  Patented July 16, 1912.

Application filed October 22, 1910. Serial No. 588,505.

*To all whom it may concern:*

Be it known that we, EDWARD S. MOWRY and HENRY HANSON, citizens of the United States, residing at Middletown, in the county of Middlesex and State of Connecticut, have invented certain new and useful Improvements in Anchors, of which the following is a specification, reference being had therein to the accompanying drawings.

Our invention relates to new and useful improvements in anchors, referring more particularly to that type of anchor wherein the shank is loosely connected with the head and prevented from disengagement therefrom by a key; and has for its object, among other things, to produce such an anchor with a shank that will have the maximum bearing surface in the head in its outermost positions, and a minimum bearing surface in its mesne positions; as well as to provide means for economically and readily securing the key within the head.

To these, and other ends, our invention consists in the anchor, having certain details of construction and combinations of parts as will be hereinafter described and more particularly pointed out in the claims.

Referring to the drawings, in which like numerals of reference designate like parts in the several figures; Figure 1 is a view of our improved anchor complete; Fig. 2 is a fragmentary sectional view thereof upon line A—B of Fig. 1, with the shank shown in one of its outer positions; Fig. 3 is a view similar to that shown in Fig. 1, with a portion of the head in section upon line C—D of Fig. 2; Fig. 4 is an enlarged view of a portion of the head upon line C—D of Fig. 2; and Fig. 5 is a perspective view of the shank.

In the drawings, the numeral 1 designates the head, having the integral flukes 2 and a slot 3 in the underside thereof, with angular terminal walls 4 at each end opening into the shank orifice 5 that is substantially parallel with the flukes. The shank 6 has a shackle opening 7 in one end and lugs 8 at the other end, said lugs being upon opposite sides of the shank and having angular faces 9—9 which terminate in the point 12. The shank orifice 5 is wider than the slot 3, and the end walls 10, adjacent to the bottom walls or shoulders 11, are at a right angle to that portion thereof adjacent thereto, this angle being the same as that between the inclined faces 9 of the lugs 8. The head and shank are assembled by passing said shank through the orifice 5 and slot 3 until the point 12 of the lug 8 rests upon the walls or shoulders 11, as shown in Fig. 3, and is prevented from disengagement therefrom by a key 13, which extends across the orifice 5 with its ends projecting into and resting in the pockets 14—14 in the opposite walls of said orifice. This key is secured in position by first heating the same while curved, as shown by the broken lines 15 in Fig. 3, and then passing the ends thereof down through the grooves 16, which extend from the outside of the head to the pockets 14 and guide the ends of the key into said pockets, the opposite ends of said key then resting upon the bottom walls 17 of said pockets, which forms an anvil for straightening out the key when blows are applied thereto, so that the key when straightened out assumes the position shown in Fig. 3.

We are aware that keys have heretofore been secured to anchors by first heating them and projecting the ends thereof into pockets, but so far as at present advised, we are the first to provide a groove leading from the outside of the head to the key pockets, thereby forming a guideway for the key before reaching said pockets, and enabling us to utilize the bottom walls of said pocket as an anvil to assist in straightening the key.

The shank, when in one of its outer positions, occupies the relative position shown in Fig. 2, wherein the angular faces 9 of the lug 8 are in contact with the bottom wall or shoulder 11 of the orifice 5 and the side wall 10, with one edge of said shank resting against one of the terminal walls 4 of the slot 3. In this position the shank has the maximum bearing surface, having engagement with three walls, and thereby makes a strong and rigid connection therebetween. While moving from its extreme positions the point 12 of the lug 8 rides upon the wall or shoulder 11 or within the orifice 5 without engaging said wall, there being ample room between the bottom of the key 13 and the wall 11 to permit this movement.

Having described our invention, what we claim as new and desire to secure by Letters Patent, is:—

1. An anchor including a head having a recess, said recess being formed to have opposite parallel grooves which are enlarged at their inner ends to form pockets, the pockets forming bottom walls which act as anvils, a shank having a head in the recess, and a pin to secure the shank in the recess, said pin when introduced being of non-straight shape and having its ends resting on the anvils, whereby when the pin is straightened by hammering the same on the anvils, the ends thereof will project into the pockets and be held thereby against outward movement.

2. In an anchor, a head having a recess, the opposite side walls of which recess are formed with enlarged bottom portions; means for closing one end of said recess; and a shank having a substantially triangular face upon each side thereof, the angular side walls of said faces toward the free end of the shank having contact with said enlarged bottom portions at the corners thereof, and the portions adjacent thereto, the arrangement of said recess closing means and shank being such that said shank is capable of movement in the direction of its length toward and away from said recess closing means, not only when said shank is in its intermediate positions but also when in its extreme positions.

3. In an anchor, a head having a recess, the opposite side walls thereof being formed with enlarged bottom portions, means for closing one end of said recess, and a shank having parts thereon that contact with said enlarged bottom portions at the corners thereof and the portions adjacent thereto, the arrangement of said recess closing means and shank being such that said shank is capable of movement in the direction of its length toward and away from said recess closing means, not only when said shank is in its intermediate positions but also when in its extreme positions.

In testimony whereof we affix our signatures in presence of two witnesses.

EDWARD S. MOWRY.
HENRY HANSON.

Witnesses:
JAMES DRENNAN,
JAMES R. EDLIN.

Copies of this patent may be obtained for five cents each, by addressing the "Commissioner of Patents. Washington, D. C."